Figures 1, 2:
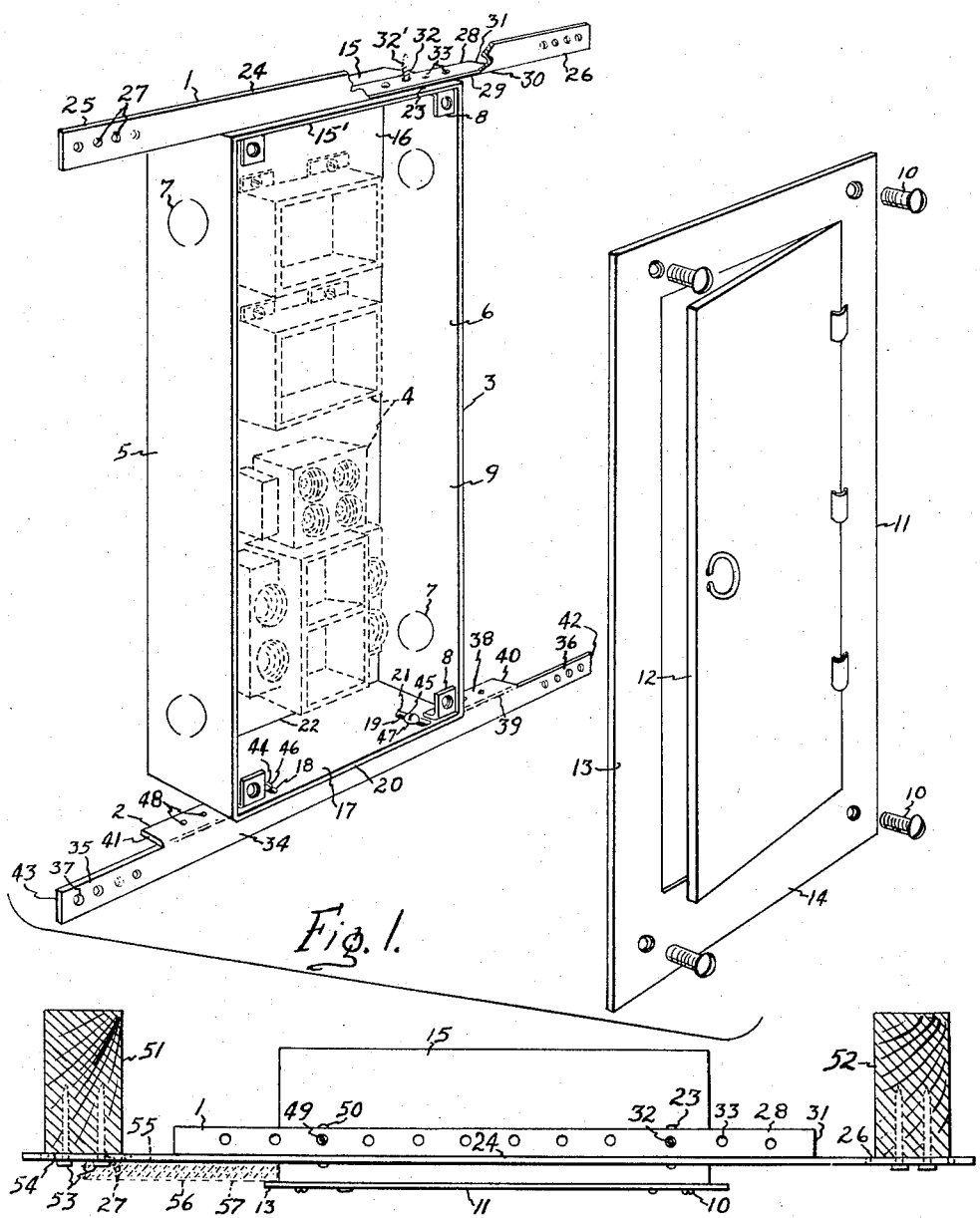

March 24, 1959

J. W. HAGAN 2,878,955

PANEL BOX MOUNTING

Filed Nov. 27, 1956

INVENTOR.
James W. Hagan
BY George H. Baldwin
Attorney

United States Patent Office 2,878,955
Patented Mar. 24, 1959

2,878,955

PANEL BOX MOUNTING

James W. Hagan, Jacksonville, Fla.

Application November 27, 1956, Serial No. 624,671

1 Claim. (Cl. 220—3.9)

This invention relates to an electrical panel box and mounting.

An object of the invention is to improve the mounting of panel boxes in wall installations.

A specific object of the invention is to provide a panel box mounting arrangement adapted to support the box from wall studs which will be simple and inexpensive, which will permit ready installation and which will permit the box to be moved inwardly and outwardly with respect to the wall after the completion of plastering or other finishing of the wall.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawing, in which:

Fig. 1 is an exploded perspective view of a panel box and mounting arrangement in accord with the invention and Fig. 2 is a top plan view of the assembled box and mount installed by attachment to wall studs, shown in section, a portion of the finished wall being represented in broken lines.

As seen in Fig. 1, an upper support member 1 and lower support member 2 are connected to rectangular metal electrical panel box 3, which contains electrical apparatus, including fuse and circuit breaker boxes, and the like, generally designated in broken lines at 4. The side walls 5 and 6 of the box are provided with suitable knockouts 7 to provide access for wiring connections to apparatus 4. Corner tabs 8 are located adjacent the front opening 9 of the box positioned to receive the mounting screws or bolts 10 by which a front cover 11 is connected to the box to cover the front opening. A suitable hinged door 12 forms a part of the front cover 11, and the edge portions of the cover, such as portions 13 and 14, comprise outwardly extending flanges adapted to lie flush against the outer wall surface adjacent the box when the box installation is completed.

Rectangular upper end wall 15 of box 3 lies in a horizontal plane, while the front opening 9 of the box lies in a substantially vertical plane. Rectangular rear wall 16 lies in a vertical plane opposite the front opening and rectangular lower end wall 17 lies in a horizontal plane opposite upper wall 15. Lower wall 17 is provided with elongated slots 18 and 19 which terminate forwardly adjacent the front edge 20 of wall 17 and which extend rearwardly, in respective parallel directions, to terminate rearwardly, such as at 21, substantially forwardly of the rear edge 22 of wall 17. It will be understood that the rear edge 22 of lower end wall 17 joins rear wall 16. The slots 18 and 19 may be approximately one inch in length, assuming a box depth measured between edges 20 and 22 of about three inches. A similarly arranged pair of parallel slots, including a slot 23, are formed in upper end wall 15.

Upper mounting member or bracket 1 comprises a web 24 disposed to lie in a vertical plane parallel to the plane of front opening 9, and the web is elongated and extends in a horizontal direction parallel to forward edge 15' of wall 15. The web comprises end portions 25 and 26, each end portion being perforated, such as at 27, to permit the mounting of the member to wall studs as later described. Support member or bracket 1 is attached to end wall 15 by means of a flange 28 lying externally of the box against end wall 15 and extending horizontally in a direction substantially parallel to front edge 15' of wall 15. The flange 28 has a forward edge 29 joined along the lower edge 30 of web 24 and terminates in an end 31 short of the stud-face-attachment end portion 26 of the web. A self-tapping screw 32 extends from a head within box 3 through slot 23 and threadably engages in a selected one of a plurality of small round openings 33 spaced along flange 28. The openings are preferably spaced with a regular and constant spacing, and the openings are of less diameter than the width of the end wall slots, whereby the screw shank 32' passes freely through the slot and cuts its own threads in flange 28.

Lower mounting bracket 2 comprises a web 34, disposed to lie in a vertical plane and extending in a horizontal direction parallel to front edge 20 of wall 17, and the web includes opposite end portions 35 and 36 adapted to affix the web to respective adjacent wall studs, the end portions including suitable nail-receiving openings, such as opening 37. A horizontal flange 38 is joined along fold line 39 to web 34, and it will be understood that the fold line 39 constitutes the forward edge of flange 38 and upper edge of web 34. Flange 38 has its ends 40 and 41, respectively, terminating short of end portions 35 and 36 of web 34, and if the box is intended for installation in the most common building construction wherein wall studs are placed on 16 inch centers, the overall length of flange 38 between its ends 40 and 41 may be about fourteen inches, or somewhat less, and in no event longer than about fourteen and three-eighths inches, whereas the overall length of web 34 between its extreme ends 42 and 43 may be conveniently about eighteen inches or somewhat more, but less than about sixteen inches. A plurality of openings, such as opening 37, being provided along the end portions of the web 34, the bracket is readily attached to the faces of adjacent wall studs even though the studs vary as much as an inch or two from the standard of sixteen inch spacing on centers as a result of warped studs or careless carpentry.

Flange 38 is positioned in underlying relation against lower end wall 17 externally of the box and the flange is rigidly fixed to wall 17 in a readily adjustable position by means of self-tapping screws 44 and 45 which have heads 46 and 47, respectively, disposed within box 3 and which have shanks, which are not seen in Fig. 1, passing through slots 18 and 19, respectively, and threadedly engaging in respective selected round, screw-receiving openings in flange 38 corresponding to openings 48 thereof.

It will be understood that brackets 1 and 2 correspond to each other in construction and function except that flange 28 of upper support member 1 is joined along the lower edge of web 24 while flange 38 of support member 2 is joined along the upper edge of web 34, and except that bracket 1 is attached to upper end wall 15 while bracket 2 is attached to lower end wall 17. The dimensions of the brackets, and the spacing of openings 27, 33, 37 and 48 thereof, may be identical for the two brackets. Screws 32, 44 and 45 are preferably all alike, and in each case the screw passes through its respective slot 18, 19, 23, or as shown in Fig. 2, slot 50, and is threadedly engaged in the selected flange opening or hole 33 or 48 at the respective slot. By removing the four mounting screws, the box may be adjusted, for example, in one inch steps, along the flanges toward one or the other end of each flange, thus to position the box toward one or the other of the studs to which the web end portions 25 and 35 and portions 26 and 36, respectively, are attached, or to which these portions are to be attached. It will be understood that a fourth sheet metal or self-tapping screw, which is hidden by web 24 in Fig. 1, is provided in the second slot of top wall 15. This screw is shown at 49 in Fig. 2, and it extends through upper wall slot 50 which completes, with slot 23, the pair of parallel spaced slots of the top wall.

The top plan view of Fig. 2 shows the box finally installed, mounted to spaced adjacent wall studs 51 and 52 by means of nails 53 driven through selected openings 27 of the web end portions into the front faces, such as face 54, of the respective studs. Webs 24 and 34 are each attached to the studs in the same manner. As so attached, the webs extend along the back surface 55 of the wall facing represented by plaster 56 in Fig. 2. If the wall facing is of plywood paneling, gypsum board or other dry wall material, it may be desirable to cut away portions of the front stud faces sufficiently to provide a rough mortise to receive the web end portions and nails 53 inwardly of the plane of the stud faces. Such setting in of the web ends into the studs will dispose the webs slightly inwardly from the back 55 of the wall facing 56 and will thus permit rigid facing to be applied to the studs without unsightly bulges. It is a feature of this invention that the cutting away of stud faces as described may be done roughly with no particular regard to the depth of the cuts, for, after the wall is completely surfaced, and regardless of whether the wall facing is seven-eighths inch thick plaster, one-half inch gypsum board, or one-fourth or one-eighth inch thick plywood or paneling, and regardless of whether one or both of the webs 24 and 34 is or is not parallel to the wall facing, the box may be adjusted by loosening one or more of screws 32, 44, 45 and 49 and by sliding the box inwardly or outwardly as necessary to bring the forward edges of the walls, such as edges 15' and 20, all flush with the outer wall surface 57. Such adjustment of box position may be made either prior to attachment of front cover 11, but it is convenient to attach front cover 11, to loosen screws 32, 44, 45 and 49, and then to push the box in the direction into the wall until the front cover edge portions 13, 14 lie flush against the outer wall surface 57. When the box is in its desired position, the screws are tightened to lock the box in such position.

The box is, of course, mounted to studs 51 and 52 before application of the wall plaster 56 or other facing material so that the facing can be brought up to the walls of the box and leave an appropriate opening for the box, but it is not necessary to finish the wall to be flush with the box edges, and, for example, if the plasterer wishes to reset the box after the sand coat but before applying the finish coat, such adjustment is readily accomplished without disturbing any part of the sand coat.

While only a certain preferred embodiment of this invention has been shown and described by way of illustration, many modifications will occur to those skilled in the art and it is, therefore, desired that it be understood that it is intended in the appended claim to cover all such modifications as fall within the true spirit and scope of this invention.

What is claimed as new and what it is desired to secure by Letters Patent of the United States is:

In combination, a panel box and mounting means adapted for mounting said box in the space between adjacent spaced wall studs, said box comprising a hollow rectangular box of non-inflammable rigid material with horizontal top and bottom walls and upstanding side walls, said walls having front edges defining a vertical planar front opening, each of said top and bottom walls having therethrough a respective pair of spaced slots which terminate forwardly adjacent the front edge of the respective wall and which extend rearwardly in a direction perpendicular to said front opening, an upper and a lower support member, each said support member comprising a horizontal flange and a vertical web, said flange and web of said upper support member being joined together along the forward edge of the flange and the lower edge of the web and the flange having a length less than the spacing of said studs and greater than the distance between said upper wall slots and the flange having at least two openings therein spaced apart therealong by a distance equal to the spacing of said upper wall slots, said flange and web of said lower support member being joined together along the upper edge of the web and the forward edge of the flange and the flange having a length less than the spacing of said studs and greater than the distance between said lower wall slots and the flange having at least two openings therein spaced apart therealong by a distance equal to the spacing of said lower wall slots, the web of each said support member extending at each end beyond the respective said flange and having a length greater than said stud spacing, the extending end portions of each said web constituting stud-attachment portions, and a respective screw extending outwardly from said box through each said slot with the head of each said screw in said box and with the threaded shank of each said screw engaged in a respective one of said web openings, whereby the locking of said box to, the release of said box from and the adjustment inwardly and outwardly of said box with respect to said webs is accomplished from within said box.

References Cited in the file of this patent

UNITED STATES PATENTS

| | | |
|---|---|---|
| Re. 17,222 | Newman | Feb. 26, 1929 |
| 1,056,759 | Mallery | Mar. 18, 1913 |
| 1,828,064 | Paine | Oct. 20, 1931 |
| 2,422,553 | Johansson | June 17, 1947 |